(12) United States Patent
Lye

(10) Patent No.: US 10,344,910 B1
(45) Date of Patent: Jul. 9, 2019

(54) SYSTEMS AND METHODS RELATING TO SUPPORT ASSEMBLIES THAT SUPPORT ELECTRONIC DEVICES

(71) Applicant: Rain Design, Inc., Berkeley, CA (US)

(72) Inventor: Kok Hong Lye, Singapore (SG)

(73) Assignee: Rain Design, Inc. CA (US)

(*) Notice: Subject to any disclaimer, the term of this patent is extended or adjusted under 35 U.S.C. 154(b) by 0 days.

(21) Appl. No.: 15/921,675

(22) Filed: Mar. 15, 2018

Related U.S. Application Data

(60) Provisional application No. 62/638,157, filed on Mar. 4, 2018.

(51) Int. Cl.
*F16M 11/16* (2006.01)
*F16M 11/08* (2006.01)
(Continued)

(52) U.S. Cl.
CPC ............. *F16M 11/08* (2013.01); *F16M 11/16* (2013.01); *F16M 11/22* (2013.01); *A47B 23/044* (2013.01)

(58) Field of Classification Search
CPC ........ F16M 11/08; F16M 11/16; F16M 11/22; F16M 11/04; F16M 11/041; F16M 11/043; A47B 23/044
USPC ....... 248/371, 394, 398, 158, 139, 146, 159, 248/163.1, 165, 166, 168, 169, 439, 173, 248/440, 440.1, 188.1, 188, 188.6, 188.8, 248/188.91, 919–923
See application file for complete search history.

(56) References Cited

U.S. PATENT DOCUMENTS

| | | | | |
|---|---|---|---|---|
| 4,579,229 A | * | 4/1986 | Porcaro | G10G 5/00 108/53.5 |
| 5,029,784 A | * | 7/1991 | Blahout | A47F 7/0057 248/166 |

(Continued)

FOREIGN PATENT DOCUMENTS

| | | |
|---|---|---|
| CN | 202600608 U | 12/2012 |
| KR | 2004557870000 Y1 | 9/2011 |

OTHER PUBLICATIONS

The sky wind, "Lightweight folding notebook stand Reviews", Published on Jun. 18, 2017, 21 pages, retrieved on Nov. 21, 2018.

(Continued)

*Primary Examiner* — Nkeisha Smith
(74) *Attorney, Agent, or Firm* — EcoTech Law Group, P.C.

(57) ABSTRACT

Portable electronic device stands and related methods are described. The electronic device stands include a base, a first arm, and a second arm. The base includes: (i) a horizontal support; (ii) a first vertical support including a first arm-receiving portion having first grooves defined therein; (iii) a second vertical support including a second arm-receiving portion having second grooves defined therein. The base is configured such that the first and second vertical supports are disposed on two ends of the horizontal support, with each of the first and second arms rotatably engaged with the first and second vertical supports, respectively, using a first fastening assembly or a second fastening assembly, respectively. In a collapsed configuration, the first and second arms are disposed antiparallel to and abutting each other; in an open configuration, the first and second arms are disposed parallel to each other, each extending about 90 degrees from the base.

21 Claims, 7 Drawing Sheets

(51) Int. Cl.
*F16M 11/22* (2006.01)
*A47B 23/04* (2006.01)

(56) References Cited

U.S. PATENT DOCUMENTS

| | | | |
|---|---|---|---|
| 5,221,066 A * | 6/1993 | Ferrigan | B60J 7/106 248/166 |
| 6,877,706 B2 * | 4/2005 | Harrison | G10G 5/00 211/195 |
| 7,384,020 B2 * | 6/2008 | Hsu | A47B 23/043 248/146 |
| 7,490,809 B2 * | 2/2009 | Liang | F16M 11/10 248/146 |
| 7,516,935 B2 * | 4/2009 | Liang | F16M 11/10 248/146 |
| 8,231,086 B1 | 7/2012 | Starner | |
| D689,500 S * | 9/2013 | Faulk | D14/447 |
| 8,534,619 B2 * | 9/2013 | Huang | F16M 11/10 248/163.1 |
| 2008/0265109 A1 | 10/2008 | Derry et al. | |
| 2010/0223758 A1 * | 9/2010 | Hu | F16M 13/00 16/387 |
| 2010/0243850 A1 * | 9/2010 | Derry | F16M 11/10 248/372.1 |
| 2011/0127399 A1 * | 6/2011 | Chou | F16M 11/10 248/371 |
| 2013/0299663 A1 * | 11/2013 | Pan | F16M 11/10 248/371 |

OTHER PUBLICATIONS

International Search Report and Written Opinion of International Application No. PCT/US2018/022523 dated Nov. 20, 2018, 14 pages.

* cited by examiner

SYSTEMS AND METHODS RELATING TO SUPPORT ASSEMBLIES THAT SUPPORT ELECTRONIC DEVICES

RELATED APPLICATION

The present application claims priority to U.S. provisional application No. 62/638,157, with a filing date of Mar. 4, 2018, which is incorporated herein by reference in its entirety for all purposes.

FIELD

The present arrangements and teachings relate generally to support assemblies that provide mechanical support to electronic devices, and methods thereof. More particularly, the present arrangements and teachings relate to electronic device stands and methods relating thereto, wherein the electronic device stands are collapsible and portable, and allow for cooling of electronic devices as they are supported on the electronic device stands.

BACKGROUND

Use of portable electronic devices, such as laptop computers, tablets, and smartphones, is ubiquitous. These portable electronic devices are often used as replacements for bulkier desktop computers, which take up more space, use more electricity, and are generally not portable. Because these electronic devices are often substitutes for desktop computers, users often place these electronic devices on stands to more closely mimic the use of a desktop computer in a more comfortable office or home environment. Such stands enhance the experience of using portable electronic devices by raising the keyboard and screen of the devices to more comfortable and practical levels (e.g., raising the screen to eye level and/or raising the keyboard to a level and/or angle that avoids repetitive stress injuries such as carpal-tunnel syndrome).

Conventional electronic device stands, however, are often bulky and large such that they lack the portability of the portable electronic devices they support, thus restricting their practical use to the locations where they are stored. Accordingly, the portable electronic device user will often not be able to use such conventional stands when working away from an office or home.

Further, portable electronic devices, like laptop computers, include processing units that control the operations of these electronic devices. Such processing units, however, generate a substantial amount of heat, particularly as technology advances and processors become increasingly powerful. Most desktop computers use fans, heat sinks, and exposure to air to dissipate the heat generated by the processor. However, in portable electronic devices such as a laptop computer, there is very little room for fans or open airspace, so heat is transferred through the underside of the computer. Unfortunately, conventional electronic device stands, because they provide a contiguous, flat surface on which the electronic device stands rest, restrict cooling of the underside of the electronic device by blocking access to circulating air.

What is, therefore, needed are effective electronic device stands that are portable and allow cooling, and that avoid the pitfalls of conventional designs.

SUMMARY OF THE INVENTION

In one aspect, the present arrangements disclose electronic device stands. An exemplar electronic device stand of the present arrangement includes a base, a first arm, and a second arm. The base includes: (i) a horizontal support; (ii) a first vertical support including a first arm-receiving portion having first grooves defined therein; and (iii) a second vertical support including a second arm-receiving portion having second grooves defined therein. The base is configured such that the first vertical support and the second vertical support are disposed on two ends of the horizontal support. Preferably, the base, the first arm, and the second are made from aluminum.

An exemplar first arm of the electronic devices stand of the present arrangements includes: (i) an extending first resting portion for resting an electronic device; (ii) a first stopping portion that extends upward and almost perpendicular the first resting portion and is designed for immobilizing the electronic device resting on the first resting portion; (iii) a first receiving portion; and (iv) a first threaded engaging end, which is disposed below the first receiving portion. The first fastening assembly is configured to couple the first threaded engaging end to the first grooves of the first vertical support.

An exemplar second arm, which is complementary to the first arm and that is part of the electronic devices stand of the present arrangement, includes analogous features: (i) an extending second resting portion for resting the electronic device; (ii) a second stopping portion that extends upward and almost perpendicular from the second resting portion and is designed for immobilizing the electronic device resting on the second resting portion; (iii) a second receiving portion; and (iv) a second threaded engaging end, which is disposed below the second receiving portion. The second fastening assembly is configured to couple the second threaded engaging end to the second grooves of the second vertical support.

Preferably, the electronic device stand is configured such that the first receiving portion has defined thereon a first receiving contour and the second receiving portion has defined thereon a second receiving contour. Likewise, the first stopping portion has defined thereon a first protruding contour and the second stopping portion has defined thereon a second protruding contour. In a collapsed configuration of the exemplar electronic device stand, the first receiving contour abuts the second protruding contour and the second receiving contour abuts the first protruding contour.

When the exemplar electronic device stand is in a collapsed configuration, the first receiving portion is designed to receive the second stopping portion, and the second receiving portion is designed to receive the first stopping portion. In this configuration, the first arm and the second extend anti-parallel with respect to each other and abut each other. In this anti-parallel arrangement or state, the first receiving contour and the second receiving contour face the same direction.

Conversely, when the exemplar electronic device stand is in an open configuration, the first arm extends parallel to the second arm, such that each of the first arm and the second arm extend approximately 90° with respect to the base. In this parallel configuration of the first arm and the second arm, the first receiving contour and the second receiving contour face in opposite directions.

Each of the first fastening assembly and second fastening assembly includes various sub-components that facilitate rotational engagement of the first arm and the second arm with respect to the first vertical support and the second vertical support, respectively. These sub-components include: (i) a pin for limiting rotation of the first arm or the second arm; (ii) a bracket having defined therein two apertures, a large aperture and a relatively small aperture, wherein the large aperture is designed to receive the first threaded engaging end or the second threaded engaging end, and the relatively small aperture is designed to receive the pin; and (iii) a rotation-restraining object having defined therein two channels, each of which is situated approximately 90° with respect to each other. One of the channels is designed to slidably receive a pin, depending on the rotational direction of the first arm or the second arm, to limit a rotational displacement of the first arm or the second arm around the first fastening assembly or the second fastening assembly. The bracket may be coupled to a first arm or a second arm. A bottom surface of the bracket may contact a top surface of the rotation-restraining object. Likewise, the rotation-restraining object may be coupled to the first vertical support or the second vertical support. Preferably, a bottom surface of the bracket contacts a top surface of the rotation-restraining object.

In certain embodiments of the present arrangements, the first fastening assembly and the second fastening assembly also include a washer, a spring washer, and a hexagon nut, each of which is disposed between the rotation-restraining object and the first grooves or the second grooves. In an assembled state of the exemplar electronic device stand, preferably, the washer, spring washer, and hexagon nut are engaged with either the first grooves or the second grooves.

According to preferred embodiments of the present arrangements, each of the first grooves of the first arm-receiving portion and the second grooves of the second arm-receiving portion are configured to limit an angle of rotation of the first arm and of the second arm, respectively, relative to the first vertical support and to the second vertical support, respectively, by blocking rotation of the pin of the first fastening assembly and of the pin of the second fastening assembly during rotation of the first arm and of the second arm, respectively, to acquire the collapsed or open configuration of the electronic device stand. Preferably, the angle of rotation of the first arm or the second arm is about 90°.

In preferred embodiments of the present teachings, in the open configuration of the electronic device stand, the electronic device rests on the extending first resting portion and the extending second resting portion. Further, in this open configuration, the first stopping portion and the second stopping portion stabilize the electronic device by contacting and immobilizing the electronic device on the electronic device stand. Further still, in this open configuration, the extending first resting portion and the extending second resting portion are positioned above one or more supporting surfaces such that a space is defined between one or more of the supporting surfaces and each of the extending first resting portion and extending second resting portion.

In certain embodiments of the present teachings, the electronic devices stands also include a first raising portion extending downward and away from the extending first resting portion and a second raising portion extending downward and away from the extending second resting portion in an open configuration of the exemplar electronic device stand. In such manner, in an open configuration of the electronic device stand, the first raising portion and the second raising portion are supported on one or more surfaces that lie along a same plane and raise the first arm and the second arm above the one or more surfaces such that a space is defined between one or more of the surfaces and the extending first resting portion and the extending second resting portion. This space facilitates air circulation underneath the electronic device resting on the extending first resting portion and the extending second resting portion, and as a result, the electronic device and its components are maintained at cooler temperatures.

Preferably, a width at a distal end of the first arm or a width at a distal end of the second arm is approximately one half of a width of the other, engaging end of the first arm or the other, engaging end of the second arm, respectively.

In another aspect, the present teachings disclose a method of assembling an electronic device stand. An exemplar method of the present teachings includes: (i) obtaining a base, a first arm (which includes a first threaded engaging end), a second arm (which includes a second threaded engaging end), a first fastening assembly, and a second fastening assembly; (ii) engaging, using the first fastening assembly, the first arm to one end of the base, which includes: (a) a horizontal support; (b) a first vertical support, which is approximately 90° with respect to the horizontal support and comprises a first arm-receiving portion having first grooves defined therein; and (c) a second vertical support, which is substantially parallel to the first vertical support and disposed approximately 90° with respect to the horizontal support and comprises a second arm-receiving portion having second grooves defined therein; and during engaging the first arm to one end of the base, the first threaded engaging end engages with the first grooves of the first arm-receiving portion; and (iii) coupling, using the second fastening assembly, the second arm to another end of the base; and wherein during the coupling the second arm to another of the end of the base, the second threaded engaging end engages with the second grooves of the second arm-receiving portion.

Preferably, each of the first fastening assembly and the second fastening assembly include a rotation-restraining object having defined therein two channels, each of which is approximately 90° with respect to each other. The method may also comprise slidably receiving at one of the channels, a pin to limit a rotational displacement of the first arm or the second arm around the first fastening assembly or the second fastening assembly, respectively. Depending on the rotational direction of the first arm or the second arm, the pin prevents advancing the rotation displacement of the first arm or the second arm past a certain point in a particular rotational direction (for achieving open configuration or closed configuration of the electronic device stand).

In another aspect, the present teachings disclose a method of using an electronic device stand. An exemplar method of this aspect includes: (i) obtaining an exemplar electronic device stand, which includes a base, a first arm, a second arm, a first fastening assembly, and a second fastening assembly; and (ii) collapsing electronic device stand such that the first receiving portion of a first arm receives a second stopping portion of a second arm, and such that the second receiving portion of the second arm receives the first stopping portion of the first arm, and in this configuration, the first arm extends anti-parallel to and abuts the second arm. The method may also include opening the exemplar electronic device stand such that the first arm extends parallel to the second arm, and each of the first arm and the second arm extend approximately 90° with respect to the base.

Systems and methods of the present teachings and arrangements, however, together with additional objects and advantages thereof, will be best understood from the following descriptions of specific embodiments when read in connection with the accompanying figures.

DETAILED DESCRIPTION OF THE PREFERRED EMBODIMENTS

In the following description, numerous specific details are set forth in order to provide a thorough understanding of the present arrangements and teachings. It will be apparent, however, to one skilled in the art that the present teachings may be practiced without limitation to some or all of these specific details. In other instances, well-known process steps have not been described in detail in order to not unnecessarily obscure the present teachings.

The arrangements and teachings of the present inventions disclose electronic device stands that provide users of certain portable electronic devices (e.g., laptop computer, tablet, smartphone, or video display) a platform that makes use of the electronic devices more pleasurable and more convenient. Unfortunately, while such electronic devices are portable, conventional electronic device stands that support them tend to be bulky and not amenable to portability. Further, conventional electronic devices stands do not provide a cooling function for the portable electronic devices they support. To this end, the embodiments of the electronic device stands, disclosed herein, include features that render them portable and allow cooling. The electronic device stands of the present arrangements also provide the advantage of sleek and aesthetically pleasing designs.

Figure 1A:
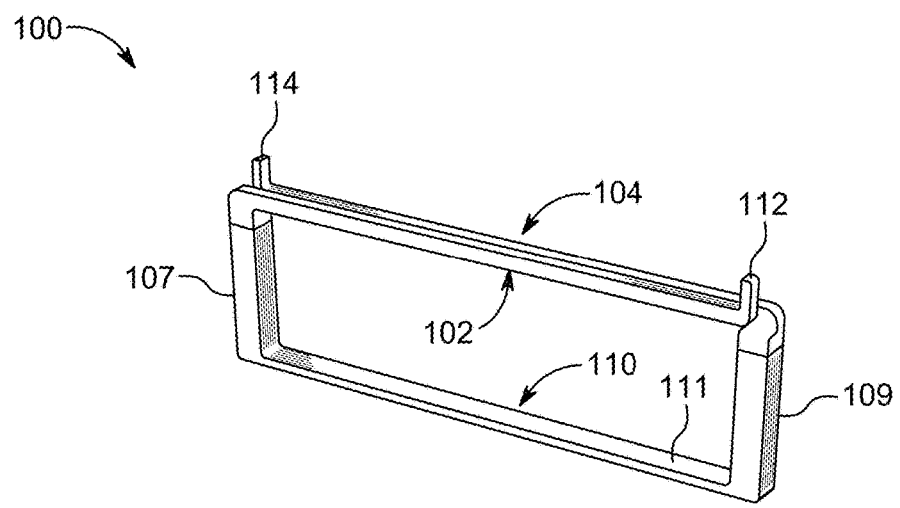
FIG. 1A is a front-perspective view of an electronic device stand, according to one embodiment of the present arrangements and that is in a collapsed, or closed, configuration.

To this end, FIG. 1A shows a perspective view of electronic device stand 100 in a collapsed, or closed, configuration, according to one embodiment of the present arrangements. Electronic device stand 100 includes a base 110 that is U-shaped. U-shaped base 110 has a horizontal support 111 with a first vertical support 107 disposed on one end of base 110, and a second vertical support 109 on an opposite end of base 110. Vertical support 107 and 109 are disposed perpendicular to horizontal support 111 of base 110, providing the U-shaped configuration. A first arm 102, at one end, is rotatably engaged at a top end of first vertical support 107, and a second arm 104, at one end, is rotatably engaged at a top end of second vertical support 109. First arm 102 and second arm 104 each also include, at an opposite end, a first stopping portion 112 and a second stopping portion 114, respectively.

In the collapsed configuration of FIG. 1A, first arm 102 and second arm 104 each extend from opposite ends of U-shaped base 110 (i.e., from first vertical support 107 and second vertical support 109, respectively). In such manner, in a collapsed configuration of the electronic devices stands of the present arrangements, first arm 102 and second arm 104 may be thought of as "anti-parallel" with respect to each other.

Further, as shown in FIG. 1A, first arm 102 and second arm 104 are shown abutting each other. As explained in further detail below, each of first arm 102 and second arm 104, at an end rotatably engaged with base 110, includes a first receiving portion (e.g., first receiving portion 106', shown in FIG. 1B) and a second receiving portion (e.g., second receiving portion 108', shown in FIG. 1B), respectively. The first receiving portion of first arm 102 receives a distal end of second arm 104, and second receiving portion of second arm 104 receives a distal end of first arm 102. In such manner, first arm 102 and second arm 104 may be thought of as "complementary" arms.

Figure 1B:
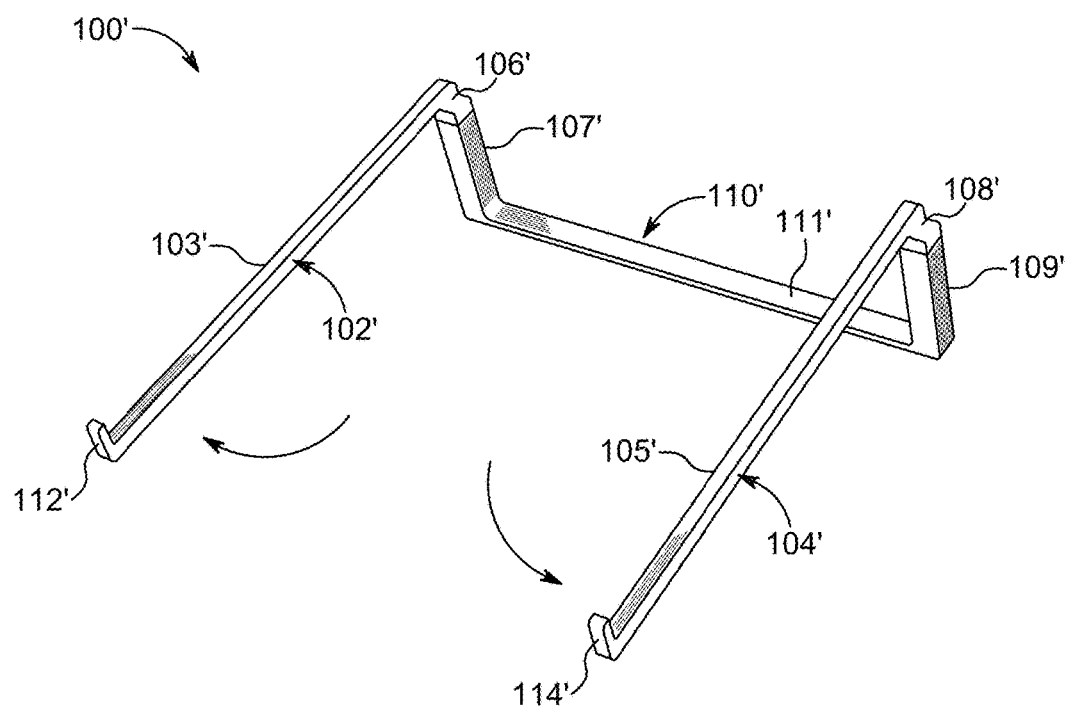
FIG. 1B is a front-perspective view of the electronic device stand of FIG. 1A in an open configuration.

FIG. 1B shows an electronic device stand 100', according to one embodiment of the present arrangements and that is in an open configuration. Electronic device stand 100' may be thought of as the same as or substantially similar to electronic device stand 100 of FIG. 1A, but in an open configuration that may be used to support an electronic device. A first arm 102', a second arm 104', a base 110', a first vertical support 107', a second vertical support 109', a horizontal support 111', a first stopping portion 112', and a second stopping portion 114' are substantially similar to their counterparts in FIG. 1A (i.e., first arm 102, second arm 104, base 110, first vertical support 107, second vertical support 109, horizontal support 111, first stopping portion 112, and second stopping portion 114).

FIG. 1B also clearly illustrates certain other sub-components of electronic device stand 100', including a first receiving portion 106' on the rotatably engaged end of first arm 102', a second receiving portion 108' on the rotatably engaged end of second arm 104', an extending first resting portion 103' disposed between first receiving portion 106' and first stopping portion 112' of first arm 102', an extending second resting portion 105' disposed between second receiving portion 108' and second stopping portion 114' of second arm 104', a first receiving portion 106' having a first receiving contour disposed at the rotatably engaged end of first arm 102', and a second receiving portion 108' having a second receiving contour disposed at the rotatably engaged end of second arm 104'.

Curved arrows located adjacent to each of first arm 102' and second arm 104' in FIG. 1B show the direction of rotation of arm 102' and arm 104' relative to vertical support 107' and 109', respectively, as an electronic device stand is transformed from the closed configuration of FIG. 1A to the open configuration of FIG. 1B. As shown in FIG. 1B, in an open configuration of electronic device stand 100', first arm 102' and second arm 104' may be thought of as parallel with respect to each other, with each of first receiving portion 106' and second receiving portion 108' facing in the same direction. In contrast, the anti-parallel configuration of first arm 102 and second arm 104 in the collapsed configuration of FIG. 1A provides that a first receiving portion of first arm 102 and a second receiving portion of second arm 104 are facing in opposite direction with respect to each other.

Each of first arm 102' and second arm 104' is rotatably engaged to vertical support 107' and vertical support 109', respectively, such that the angle of rotation of each arm relative to the corresponding vertical support is preferably about 90°. This 90° angle of rotation is implemented such that arm 102 of FIG. 1A is rotated in a direction shown by the curved arrow adjacent to first arm 102' of FIG. 1B, with rotation being limited between the configurations shown in FIGS. 1A and 1B. In a similar manner, second arm 104 of FIG. 1A is likewise rotated in the direction shown by the curved arrow adjacent to arm 104' of FIG. 1B, with rotation being limited between the configurations shown in FIGS. 1A and 1B.

As will be explained in further detail below with reference to FIG. 3B, the electronic device stands of the present teachings preferably implement fastening assemblies to rotatably engage an arm (e.g., first arm 102 and second arm 104 of FIG. 1A) with a corresponding vertical supports (e.g., vertical support 107 and vertical support 109 of FIG. 1A, respectively) such that each arm locks or engages at about 0° (i.e., when first arm 102 or second arm 104 of FIG. 1A is parallel to horizontal support 111) and at about 90° (i.e., when first arm 102' or second arm 104' of FIG. 1B is perpendicular to horizontal support 111').

In transforming from the collapsed configuration of the exemplar electronic device stand as shown in FIG. 1A to the open configuration as shown in FIG. 1B, each of first arm 102 and second arm 104 of FIG. 1A is opened, in sequence, i.e., one arm at a time. Because in the closed configuration of FIG. 1A, first arm 102 is disposed in front of second arm 104, the sequence requires initially opening first arm 102, in the rotational direction of opening shown by the adjacent curved arrow in FIG. 1B, and then subsequently opening second arm 104, in the rotational direction of opening shown by the adjacent curved arrow in FIG. 1B. Likewise, in transforming from the open configuration of FIG. 1B to the collapsed configuration of FIG. 1A, each of first arm 102' and second arm 104' of FIG. 1B is displaced in a rotational direction opposite to the arrows shown in FIG. 1B. Preferably, second arm 104' is rotated to the closed configuration, followed by first arm 102' being rotated to the closed configuration.

Figure 5:
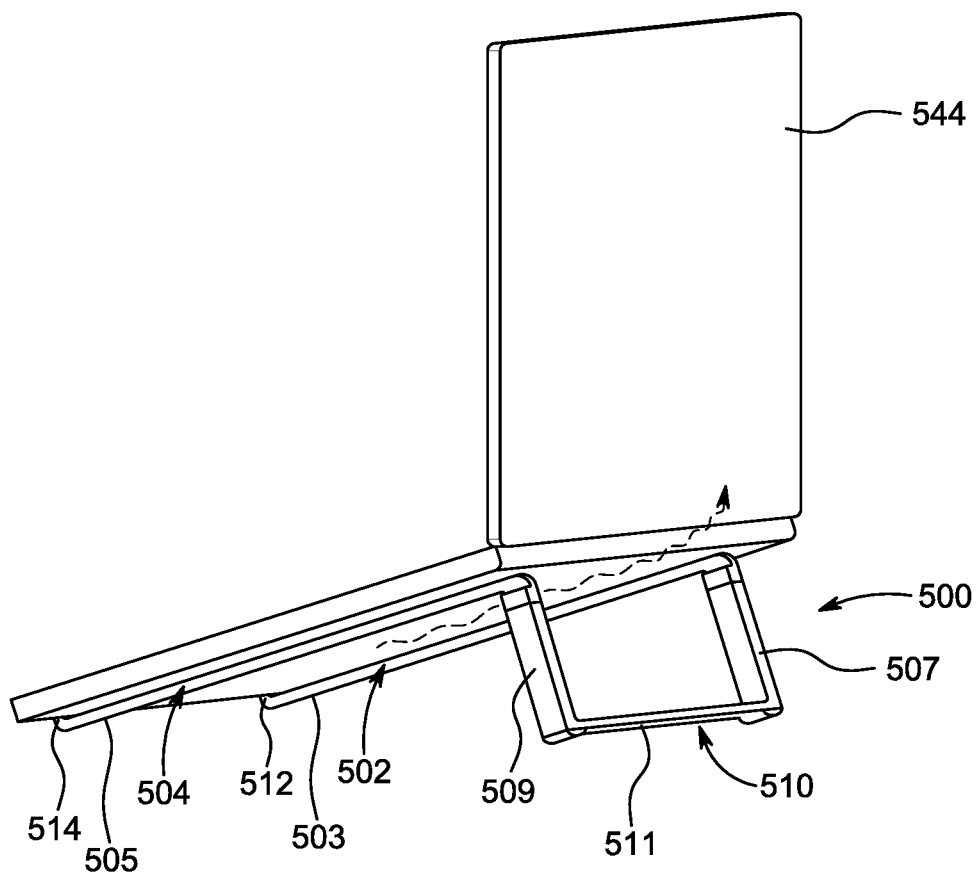
FIG. 5 is a back-perspective view of an electronic device stand, according to one embodiment of the present arrangements and that is in an open configuration with a laptop computer being supported thereon.

In an open, and operative, state of electronic device stand 100', the electronic device stand is configured to support an electronic device, such as a laptop computer (e.g., as shown in FIG. 5). Preferably, the side edges of an electronic device are resting on extending first portion 103' and extending second portion 105'. Likewise, preferably, the front edge of an electronic device rests against and/or is stabilized by first stopping portion 112' and second stopping portion 114'. Vertical supports 106' and 109' are configured to raise a back end of an electronic device, creating an open space between the bottom surface of the electronic device and the surface on which electronic device stand 100' is supported. Horizontal support 111' further serves to stabilize the structure at a back end and support the weight of the electronic device disposed thereon.

Figure 2A:
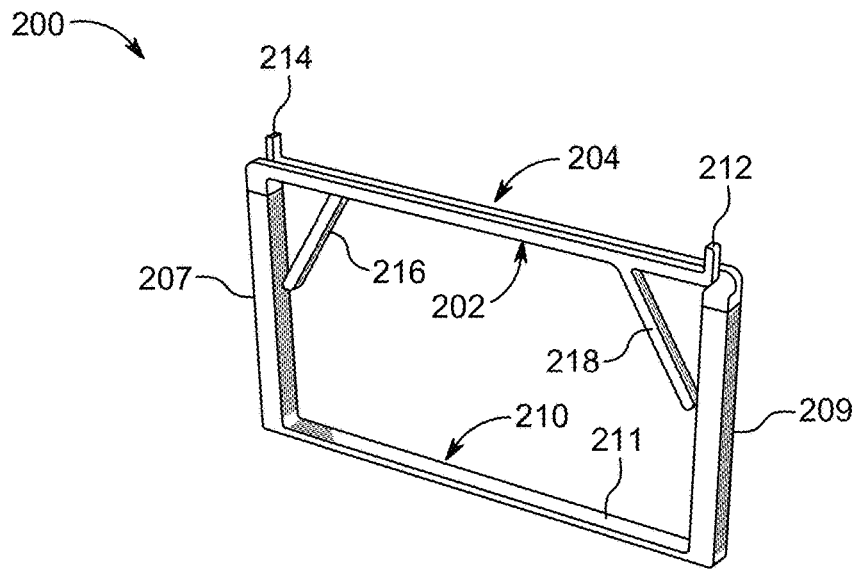
FIG. 2A is a front-perspective view of an electronic device stand, according to another embodiment of the present arrangements and that is in a collapsed, or closed, configuration.

FIG. 2A shows a perspective view of an electronic device stand 200, according to an alternate embodiment of the present arrangements and in a collapsed, or closed, configuration. A first arm 202, a second arm 204, a base 210, a first vertical support 107, a second vertical support 109, a horizontal support 111, a first stopping portion 112, and a second stopping portion 114, are substantially similar to their counterparts in FIG. 1A (i.e., first arm 102, second arm 104, base 110, first vertical support 107, second vertical support 109, horizontal support 111, first stopping portion 112, and second stopping portion 114). FIG. 2A also shows additional components not included in the embodiments of FIGS. 1A and 1B, such as a first raising portion 216 and a second raising portion 218, extending from a bottom end of first arm 202 and a bottom end of second arm 204, respectively.

Figure 2B:
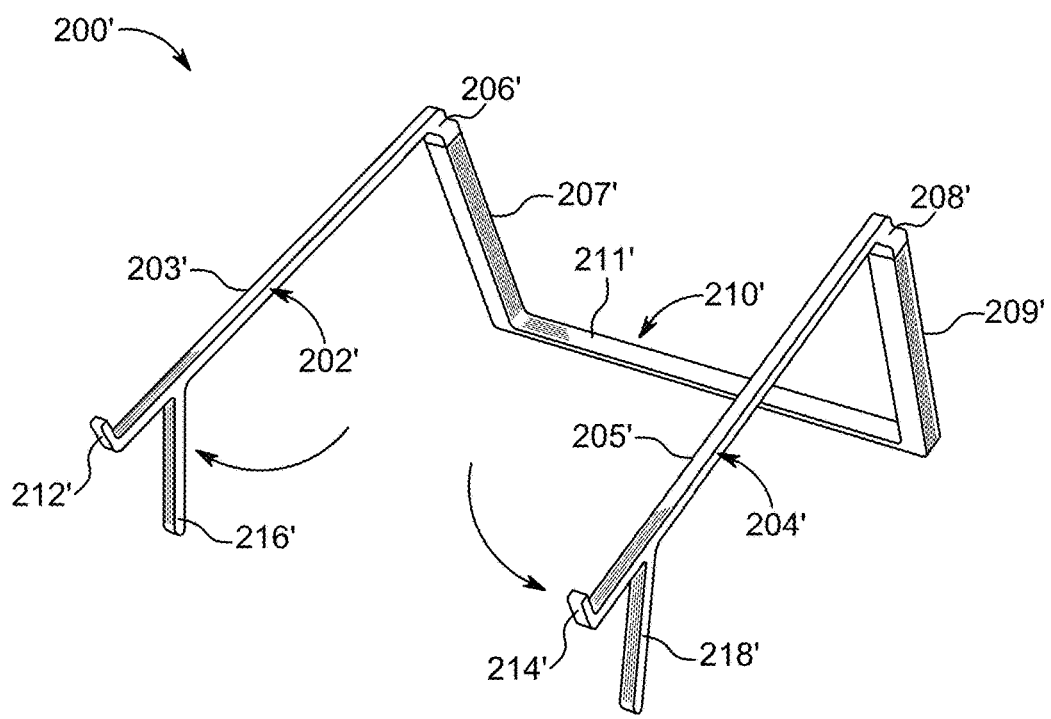
FIG. 2B is a front-perspective view of the electronic device stand of FIG. 2A in an open configuration.

FIG. 2B shows an electronic device stand 200', according to an alternate embodiment of the present arrangements. Electronic device stand 200' may be thought of as the same as or substantially similar to electronic device stand 200 of FIG. 2A, except electronic device stand 200' is in an open, or operable, configuration. A first arm 202', a first resting portion 203', a second arm 204', a second resting portion 205', a base 210', a horizontal support 211', a first vertical support 207', a second vertical support 209', a first stopping portion 212', a second stopping portion 214', a first raising portion 216', and a second raising portion 218', are substantially similar to their counterparts in FIG. 1B (i.e., first arm 102', first resting portion 103', second arm 104', second arm 105', base 110', horizontal support 111', first vertical support 107', second vertical support 109', first stopping portion 112', second stopping portion 114', first raising portion 116', and second raising portion 118'). The features shown in FIG. 2B operate in manners substantially similar to their corresponding features in FIG. 1B. Unlike the embodiment of FIG. 1B, however, first raising portion 216' and second raising portion 218' are implemented to raise the front end of electronic device stand 200' when in use. This provides the advantage of accommodating users who prefer an electronic device to be situated at a relatively higher level from the surface supporting the electronic device stand (e.g., desk, counter, platform, or lap). Preferably, when in use (i.e., in the open configuration of FIG. 2B), and unlike the electronic device stand embodiment depicted in FIG. 1B, no part of first arm 202' or second arm 204' contacts a surface supporting the electronic device stand.

As shown in the embodiments of FIG. 1A and FIG. 2A, the collapsed configurations of the electronic device stands of the present teachings and arrangements provide certain advantages over conventional laptop stands. For example, the electronic device stands in collapsed configuration provide compact structures that are easily portable with the portable electronic devices they support (e.g., a laptop computer). Accordingly, a user may easily transport the electronic devices stands of the present teachings and arrangements for use at locations away from where they may store conventional electronic device stands (e.g., at an office or a home).

Further, in the open configurations of FIGS. 2A and 2B, the electronic device stands of the present teachings and arrangements provide sleek and aesthetically pleasing designs.

Further still, because the electronic device stands of the present teachings and arrangements make use of open space between various components (e.g., as shown in FIG. 2B, between first vertical support 207' and second vertical support 209' and between arm 202' and 204'), fewer materials are required to construct these electronic devices stands, making them easier and relatively less expensive to manufacture and assemble than conventional electronic device stands.

Figure 3A:
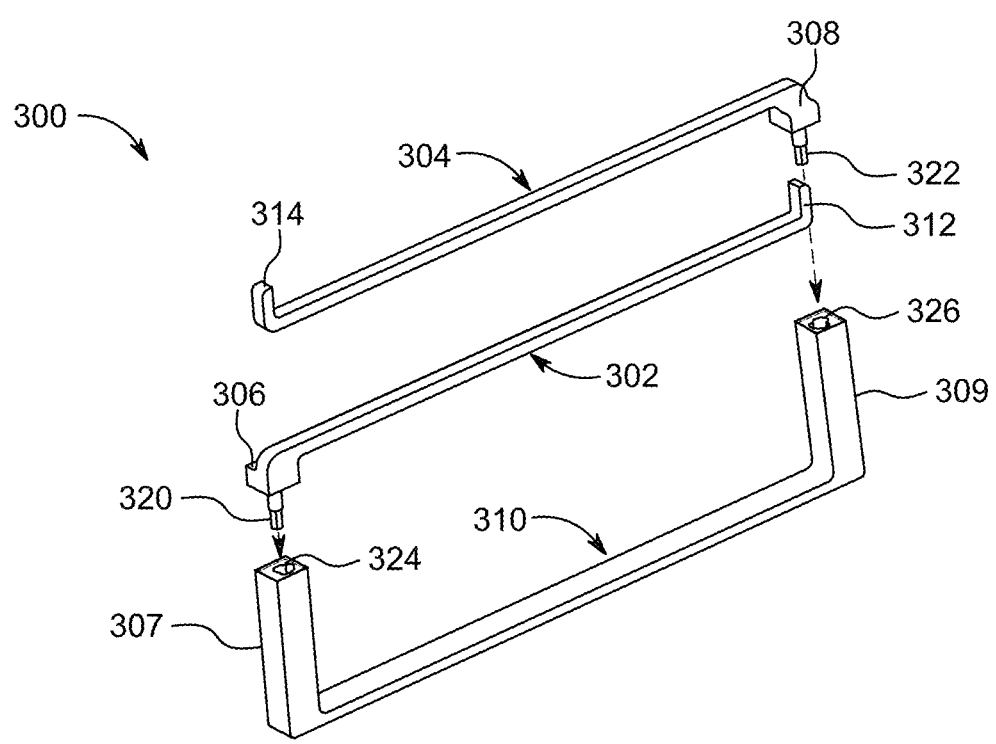
FIG. 3A is an exploded view of certain components of an electronic device stand, according to one embodiment of the present arrangements.

FIG. 3A shows an exploded view of certain components of an electronic device stand 300, according to one embodiment of the present arrangements. A first arm 302, a second arm 304, a base 310, a first stopping portion 312, a second stopping portion 314, a first receiving portion 306, and a second receiving portion 306, are substantially similar to their counterparts discussed above with reference to FIGS. 1A, 1B, 2A, and 2B.

FIG. 3A also shows certain subcomponents that are operable to rotatably engage first arm 302 and second arm 304 to each side of base 310. In particular, at an engaging end of first arm 302 and second arm 304, a first threaded engaging end 320 and a second threaded engaging end 322 each extends downward from a bottom side of an engaging end of arms 302 and 304, respectively. Further, on each side of base 310, a first arm-receiving portion 324 and a second arm-receiving portion 326 are disposed inside first vertical support 307 and second vertical support 309, respectively (described in further detail below with reference to FIG. 3B). Each of first arm-receiving portion 324 and arm-receiving portion 326 is configured with first grooves and second grooves, respectively, defined therein. First grooves and second grooves of first arm-receiving portion 324 and second arm-receiving portion 326, respectively, are designed to rotatably engage with first threaded engaging end 320 and second threaded engaging end 322, respectively.

According to one embodiment of the present arrangements, first arm 302, second arm 304, and base 310 are comprised of aluminum. More preferably, first arm 302, second arm 304, and base 310 are each milled from a single-piece extruded block of aluminum, using computer-controlled cutting machines. This allows the components to be constructed as relatively thin, while retaining rigidity, durability, and a cleaner, more polished design that is more aesthetically pleasing. In other embodiments of the present arrangements, however, various subcomponents of first arm 302, second arm 304, and base 310 are constructed separately and attached to each other.

Figure 3B:
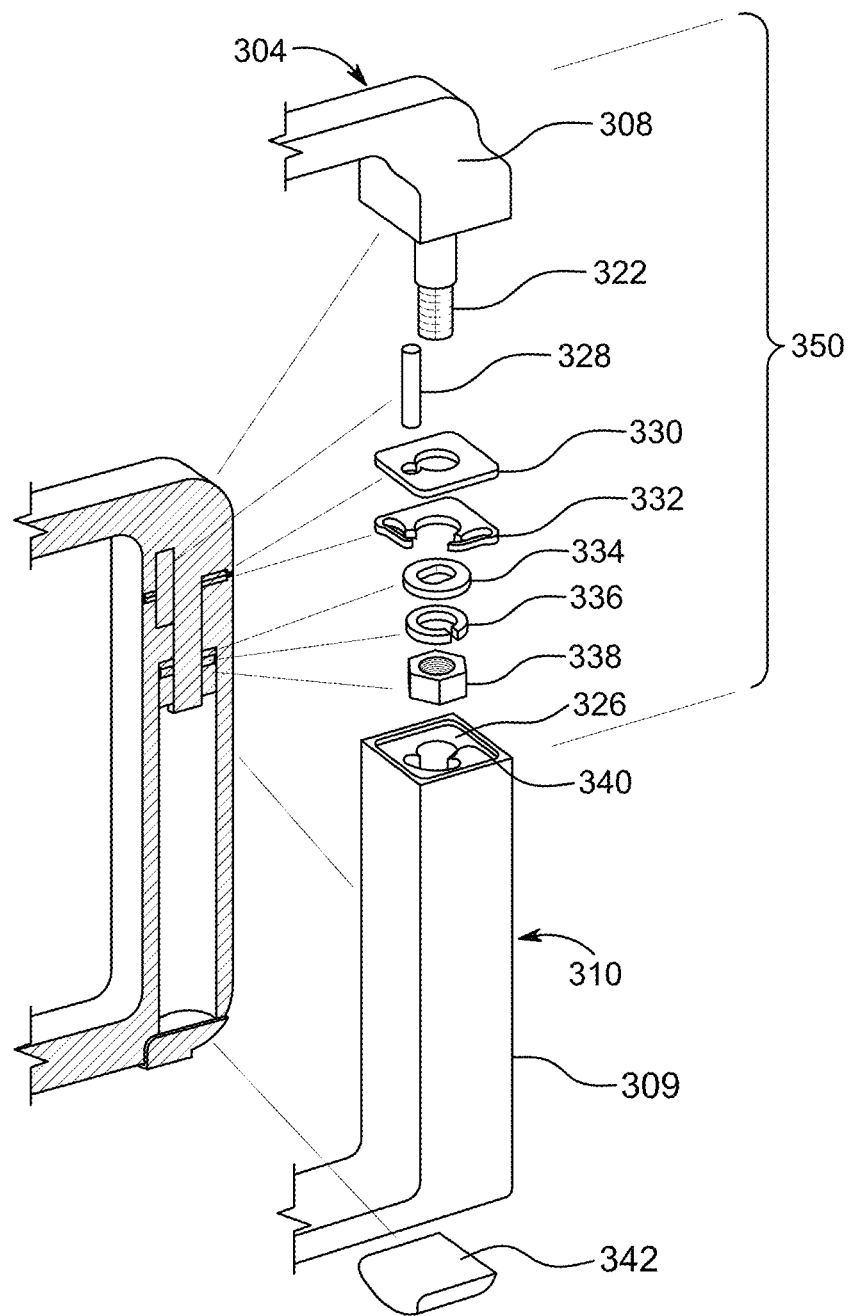
FIG. 3B is an exploded view of a fastening assembly, according to one embodiment of the present arrangements and that is used to rotatably engage certain components in the electronic device stand of FIG. 3A.

FIG. 3B shows an exploded view of certain components of a fastening assembly 350, according to one embodiment of the present arrangements. Fastening assembly 350 facilitates rotatable engagement of a first arm or a second arm (e.g., first arm 102 and second arm 104 of FIG. 1) with a vertical support of a base (e.g., first vertical support 107 or second vertical support 109 of base 110 of FIG. 1A). To the extent a fastening assembly rotatably engages a first arm with a first vertical support, it may be thought of as a "first fastening assembly"; and to the extent a fastening assembly rotatably engages a second arm with a second vertical support, it may be thought of as a "second fastening assembly".

In the embodiment of FIG. 3B, fastening assembly 350 rotatably engages second arm 304 to second vertical support 309 of base 310. The sub-components of fastening assembly 350 also include a second threaded engaging end 322 extending downward from a bottom region of an engaging end of arm 304, a pin 328, a bracket 330 with a relatively large aperture (for receiving second threaded engaging end 320) and a relatively small aperture (for receiving pin 328), a rotation-restraining object 332 with two channels, perpendicular with respect to each other, defined therein, a washer 334, a spring washer 336, and a hexagon nut 338. FIG. 3B also shows disposed inside vertical support 309 a second arm-receiving portion 326 and second grooves 340. In an assembled state of fastening assembly 350, the various sub-components of fastening assembly 350 are housed within second vertical support 309. Finally, a foot 342 may be coupled to a bottom region of base 310 adjacent to a corner of the base.

In an assembled and operable state of fastening assembly 350, these various sub-components act synergistically to provide rotation of second arm 304 relative to base 310, and to lock second arm 304 into a collapsed or open configuration.

As shown in FIG. 3B, top bracket 330 includes a relatively large aperture that is configured to receive second threaded engaging end 322 and a relatively small aperture that is configured to receive pin 328. Second threaded engaging end 322 is attached to a bottom side of an engaging end of second arm 304. Likewise, though not visible on FIG. 3B, a bottom side of the engaging end of second arm 304 includes a pin-receiving aperture that receives and stabilizes pin 328 relative to second arm 304. Accordingly, movement of pin 328 tracks rotation of second arm 324.

Further, though not visible in FIG. 3B, a bottom side of an engaging end of second arm 304 includes a form-fitting indented space that receives and stabilizes top bracket 330. Accordingly, rotation of top bracket 330, and pin 328, which is disposed through the relatively small aperture of top bracket 330, connects rotation of pin 328 with rotation of second arm 304. In other words, as second arm 304 is rotated relative to vertical support 309 of base 310, movement of pin 328 is correspondingly rotated relative to vertical support 309 of base 310.

Preferably, the depth of the indented space in the bottom region of second arm 304 is slightly less than a thickness of top bracket 330, such that a small portion of top bracket 330 protrudes out slightly from the bottom edge of second arm 304 when it is engaged therein.

In an assembled state of fastening assembly 350, a top surface of rotation-restraining object 332 contacts a bottom surface of top bracket 330. While top bracket 330 is coupled to second arm 304, rotation-restraining object 332 is coupled to second vertical support 309 in an analogous manner. Specifically, a region at a top end of second vertical support 309 includes a form-fitting indented space that is configured to receive and stabilize rotation-restraining object 332 with vertical support 309 of base 310.

Preferably, the depth of the form-fitting indented space in second vertical support 309 is slightly less than the thickness of rotation-restraining object 332 such that a small portion of rotation-restraining object 332 protrudes out of second vertical support 309. According to preferred embodiments of the present arrangements, in an operative state of fastening assembly 350, the protruding portion of rotation-restraining object 332 contacts the protruding portion of top bracket 330 (described above). These protruding regions preferably prevent a bottom edge of second arm 304 from contacting a top edge of second vertical support 309, facilitating smoother rotation of second arm 304 relative to base 310. To further facilitate smooth rotation, top bracket 330 and rotation-restraining object 332 may be comprised of hardened, polished, stainless steel, which provides surfaces that facilitate smoothening of the rotation of second arm 304 relative to base 310.

As shown in FIG. 3B, rotation-restraining object 332 also includes two channels that are disposed perpendicular with respect to each other and that are designed to receive pin 328. During rotation of second arm 304 relative to second vertical support 309, pin 320 is displaced by second arm 304 into either of these channels, depending on the direction of rotation of second arm 304. According to preferred embodiments of the present arrangements, these channels serve as "spring locks" for pin 328, which lock the arm into place in either an open or closed configuration of the present electronic device stands. According to such embodiments, the channels in rotation-restraining object 332 include an opening that is slightly smaller than the diameter of pin 328. In this configuration, when rotation of arm 302 pushes pin 328 past this opening, a lock-head is forced open, providing tension that secures the arm. As pin 328 is displaced through either channel in rotation-restraining object 332, the channel slightly enlarges at its end region such that when pin 328 is rotated into this end region, a clicking mechanism generated by release of tension locks pin 328 into place. This provides the advantage of limiting rotation of second arm 304 to 90°, i.e., between the open and collapsed configurations of the present electronic display stands.

To facilitate rotation of second arm 304 relative to second vertical support 309, second threaded engaging end 322 rotatably engages with grooves 340. Further, second grooves 340 are configured to help prevent pin 328 from advancing beyond the 90-degree angle of rotation of second arm 304 relative to second vertical support 309. To the extent grooves are associated with a second vertical support (e.g., second vertical support 109 of FIG. 1A), such grooves may be considered "second grooves".

In certain embodiments of the present arrangements, washer 334 is disposed below and contacts a bottom surface of rotation-restraining object 332. Washer 334 facilitates smoothening of the rotation of second arm 304 relative to second vertical support 309 by engaging with second grooves 340.

In other embodiments of the present arrangements, spring washer 336 is disposed below and contacts a bottom surface of washer 334. Spring washer 336 engages with second grooves 340 and is designed to prevent hexagon nut 338 from loosening.

Hexagon nut 338 mounts second arm 304 to second vertical support 309 by engaging with second grooves 340, thus stabilizing the various components of fastening assembly 350.

As shown in FIG. 3B, second vertical support 309 includes an open space disposed therein. In an assembled state of the present electronic display stands, components of fastening assembly 350 are hidden and unexposed in this open space. This provides the advantage of preventing various components of the fastening assembly from loosening, and provides for a cleaner, more aesthetically pleasing design.

Though not considered part of fastening assembly 350, FIG. 3B also shows a cover 342 disposed on a bottom end of second vertical support 309. Cover 342 provides a support when base 310 contacts a surface on which the electronic device stands of the present arrangements are supported. The rounded design of cover 342 help stabilize the electronic designs stands of the present arrangements when in use.

Figure 4A:
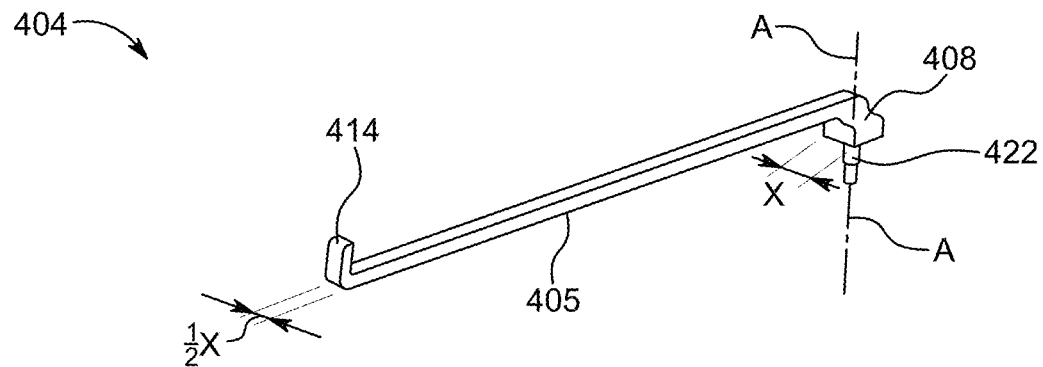
FIG. 4A is a perspective view of an electronic device stand arm, according to one embodiment of the present arrangements, showing on one, engaging end a width, "X," and on another, distal end a width, "½X."

FIG. 4A shows a perspective view of a second arm 404, according to one embodiment of the present arrangements. Second arm 404, an extending second resting portion 405, a second receiving portion 408, a second stopping portion 414, and a second threaded engaging end 422 are substantially similar to their counterparts described above in FIG. 1A. FIG. 4A also shows a line "A", which represents the axis of rotation of second arm 404 relative to a base (e.g., base 110' of FIG. 1B). FIG. 4A also shows that an engaging end of second arm 404 has a width, "X", while a distal end of second arm 404 has a width of approximately "½X".

Figure 4B:
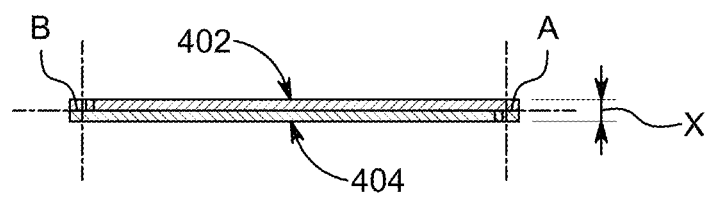
FIG. 4B is a top view of an electronic device stand, according to one embodiment of the present arrangements, in a collapsed configuration and showing on each end a width, "X," and either an axis of rotation, "A," or "B."

FIG. 4B shows a top view of an electronic device stand 400 in a collapsed configuration, with a first arm 402 and a second arm 404 disposed anti-parallel to and abutting each other. Second arm 404 in FIG. 4B may be thought of as the same as or substantially similar to second arm 404 of FIG. 4A. Likewise, first arm 402 may be thought of as complementary to second arm 404. As shown in FIG. 4B, a thickness of electronic device stand is approximately "X".

Due to the novel, complementary designs of arms 402 and 404, a thickness of electronic design stand 400 is approximately the same as a thickness of each of arms 402 and 404 at their engaging ends, even though arms 402 and 404 are aligned next to each other in a collapsed state of the present electronic device stands. This is accomplished by configuring the relatively wider engaging ends of arms 402 and 404 to receive the relatively thinner distal ends of arms 404 and 402, respectively, at a first receiving portion (e.g., first receiving portion 106' of FIG. 1B) or at a second receiving portion (e.g., second receiving portion 108' of FIG. 1B). Preferably, a first receiving portion and a second receiving portion include a first receiving contour and a second receiving contour that is configured to receive a distal end of a complementary arm. In such manner, first arms 402 and 404 are configured to overlap at their opposite ends. Because a thickness of electronic device stand 400 does not exceed a thickness of any one component arm the present arrangements provide a structure that is relatively compact and portable relative to conventional designs.

Moreover, as shown in the configuration of FIG. 4B, axes of rotation "A" and "B" are disposed approximately halfway between a each edge of electronic device stand 400. This configuration allows electronic device stand 400 to remain flat when each of arms 402 and 404 is locked in a closed configuration. Further, when arms are locked in an open configuration, each of arms 402 and 404 will extend away from a base the same distance. A closed configuration, in which the two arms of the electronic device stand are not overlapping, would be unable to accomplish these effects.

FIG. 5 shows a back-perspective view of a laptop computer 544 displayed on an electronic device stand 500, according to one embodiment of the present arrangements. First arm 502, second arm 504, extending first resting portion 503, extending second resting portion 505, first vertical support 507, second vertical support 509, base 510, horizontal support 511, first stopping portion 512, and second stopping portion 514 are substantially similar to their counterparts described above with respect to FIG. 1B.

As shown in FIG. 5, side edges of laptop computer 544 rest on electronic device stand 500 by distributing its weight along extending first resting portion 503 and extending second resting portion 505. Preferably, as shown in FIG. 5, a bottom edge of laptop computer 544 is stabilized by resting against or abutting first stopping portion 512 and second stopping portion 514.

The configuration of electronic device stand 500 includes certain advantages. Because laptop computer 544's weight is distributed on arms 502 and 504, an open region between arms 502 and 504 is exposed to circulating air through the back end of the stand (as shown by the dashed arrow in FIG. 5) due to being raised from a surface. This circulating air provides a "cooling" effect on the processor and related components typically housed in the bottom region of a laptop computer. This circulating air prevents laptop computer 544 from overheating, extending the life of the computer, extending battery time, and avoiding discomfort in situations where a user works with an overheated laptop on his or her lap.

Figure 6:
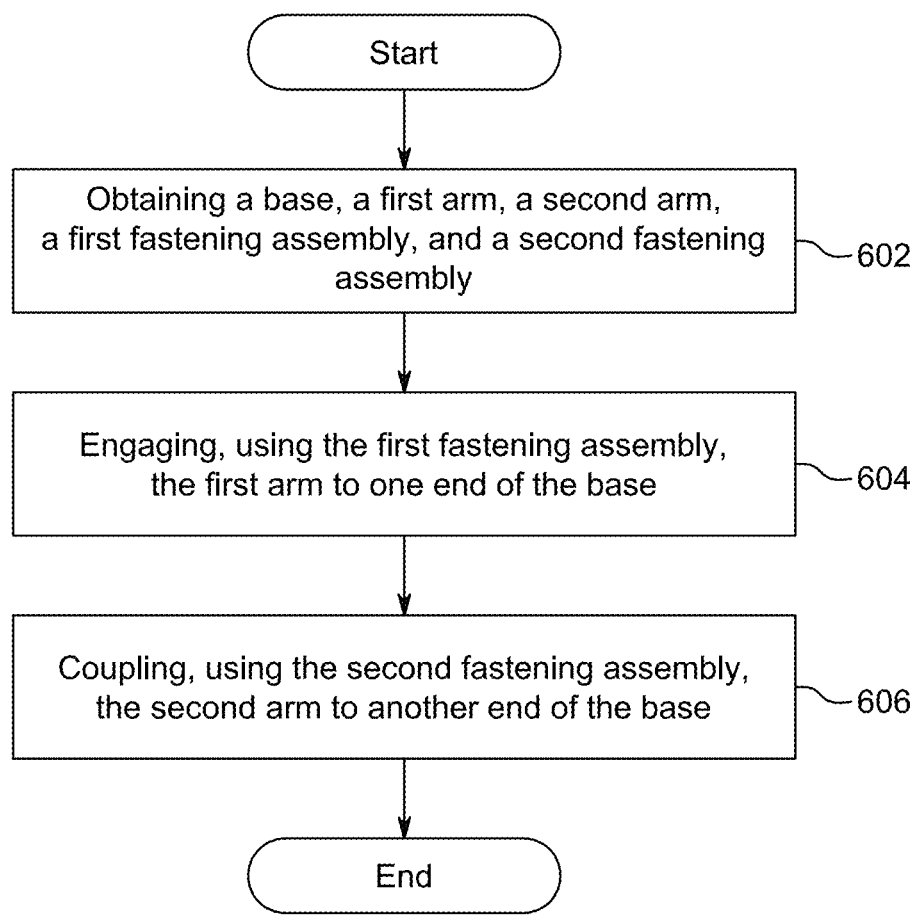
FIG. 6 is a flowchart showing a process, according to one embodiment of the present teachings, for assembling an electronic device stand.

In another aspect, the present teachings disclose a method for assembling the electronic devices stands of the present teachings and arrangements. To this end, FIG. 6 is a flowchart showing certain salient steps in a process 600, according to one preferred embodiment of the present teachings, for assembling an electronic device stand. Process 600 may begin with a step 602, which includes obtaining a base (e.g., base 110 of FIG. 1A), a first arm (e.g., first arm 102 of FIG. 1A), a second arm (e.g., second arm 104 of FIG. 1A), a first fastening assembly (e.g., fastening assembly 350 of FIG. 3B), and a second fastening assembly (e.g., fastening assembly 350 of FIG. 3B).

Next, a step 604 includes engaging, using the first fastening assembly, the first arm to one end of the base (e.g., at vertical support 107' of FIG. 1B). This step requires that the first arm is engaged to one end of the base (e.g., at a first vertical support) such that a first threaded engaging end on the arm engages with first grooves of the first arm-receiving portion of the vertical support.

Then, a step 606 includes coupling, using the second fastening assembly, the second arm to another end of the base (e.g., at vertical support 109' of FIG. 1B). Coupling in step 602 and engaging in step 606 may be thought as substantially the same. This step requires that the second arm is coupled to one of the end of the base (e.g., at a second vertical support) such that a second threaded engaging end on the arm engages with second grooves of the second arm-receiving portion of the vertical support. In certain embodiments of the present teachings, step 606 may be performed before step 604 is carried out.

In another aspect, the present teachings disclose a method of using an electronic device stand. The method includes obtaining an electronic device stand in an open configuration (e.g., electronic device stand 100' of FIG. 1B) that has a base (e.g., base 110' of FIG. 1B), a first arm (e.g., first arm 102' of FIG. 1B), a second arm (e.g., second arm 104' of FIG. 1B), a first fastening assembly (e.g., fastening assembly 350 of FIG. 3B), and a second fastening assembly (e.g., fastening assembly 350 of FIG. 3B).

Next, the method of using an electronic device stand includes collapsing the electronic device stand such that the first receiving portion receives the second stopping portion, the second receiving portion receives the first stopping portion. In this configuration, the first arm abuts the second arm and extends anti-parallel relative to the second arm.

In certain embodiments of the present teachings, the method of using an electronic device stand includes transforming the electronic device stand in its collapsed state to an open state. To this end, this method requires opening the electronic device stand such that the first arm and the second arm extend approximately 90° with respect to the base, with an open space defined between the first arm and the second arm. When the electronic devices stands are in this open configuration, with a space also defined between the bottom surface of an electronic device supported by the electronic device stand by the vertical supports of the base, circulating air through these defined spaces will serve to cool the electronic device being used.

Although illustrative embodiments of the present arrangements and teachings have been shown and described, other modifications, changes, and substitutions are intended. Accordingly, it is appropriate that the appended claims be construed broadly and in a manner consistent with the scope of the disclosure, as set forth in the following claims.

What is claimed is:

1. An electronic device stand comprising:
   a base comprising:
      a horizontal support;
      a first vertical support including a first arm-receiving portion having first grooves defined therein;
      a second vertical support including a second arm-receiving portion having second grooves defined therein; and
      wherein said first vertical support and said second vertical support being disposed on two ends of said horizontal support;
   a first arm comprising:
      an extending first resting portion for resting an electronic device;
      a first stopping portion that extends upward and almost perpendicular from said first resting portion and is designed for immobilizing said electronic device resting on said first resting portion;
      a first receiving portion;
      a first threaded engaging end, which is disposed below said first receiving portion;
      a first fastening assembly for coupling said first threaded engaging end to said first grooves of said first vertical support;
   a second arm comprising:
      an extending second resting portion for resting said electronic device;
      a second stopping portion that extends upward and almost perpendicular from said second resting portion and is designed for immobilizing said electronic device resting on said second resting portion;
      a second receiving portion;
      a second threaded engaging end, which is disposed below said second receiving portion;
      a second fastening assembly for coupling said second threaded engaging end to said second grooves of said second vertical support; and
      wherein, in a collapsed configuration of said electronic device stand, said first receiving portion is designed to receive said second stopping portion, and said second receiving portion is designed to receive said first stopping portion.

2. The electronic device stand of claim 1, wherein in an open configuration of said electronic device stand, said first arm extends parallel to said second arm.

3. The electronic device stand of claim 2, wherein in said open configuration of said electronic device stand, each of said first arm and said second arm extend approximately 90 degrees with respect to said base.

4. The electronic device stand of claim 1, wherein in said collapsed configuration of said electronic device stand, said first arm extends anti-parallel to and abuts said second arm.

5. The electronic device stand of claim 1, wherein said first receiving portion has defined thereon a first receiving contour and second receiving portion has defined thereon a second receiving contour, and wherein said first stopping portion has defined thereon a first protruding contour and said second stopping portion has defined thereon a second protruding contour, such that in said collapsed configuration of said electronic device stand, said first receiving contour abuts said second protruding contour and said second receiving contour abuts said first protruding contour.

6. The electronic device stand of claim 5, wherein each of said first receiving contour and said second receiving contour face in a same direction.

7. The electronic device stand of claim 1, wherein each of said first and said second fastening assembly includes:
   a pin for limiting rotation of said first arm or said second arm;
   a bracket having defined therein two apertures, a large aperture and a relatively small aperture, wherein said large aperture being designed to receive said first threaded engaging end or said second threaded engaging end, and said relatively small aperture being designed to receive said pin; and
   a rotation-restraining object having defined therein two channels, each of which are approximately 90 degrees to each other and one of said channels slidably receives a pin, depending on the rotational direction of said first arm or said second arm, to limit a rotational displacement of said first arm or said second arm around said first fastening assembly or said second fastening assembly.

8. The electronic device stand of claim 7, wherein a bottom surface of said bracket contacts a top surface of said rotation-restraining object.

9. The electronic device stand of claim 7, wherein each of said first fastening assembly and said second fastening assembly further comprising a washer, a spring washer, and a hexagon nut, each of which are disposed between said rotation-restraining object and said first groove or said second groove.

10. The electronic device stand of claim 9, wherein each of said first grooves of said first arm-receiving portion and said second grooves of said second arm-receiving portion are configured to limit an angle of rotation of said first arm and of said second arm, respectively, relative to said first vertical support and to said second vertical support, respectively, by blocking said pin of said first fastening assembly of said pin of said second fastening assembly during rotation of said first arm and of said second arm, respectively, to acquire said collapsed or an open configuration of said electronic device stand.

11. The electronic device stand of claim 10, wherein said angle of rotation of said first arm or said second arm is about 90 degrees.

12. The electronic device stand of claim 1, wherein said electronic device is at least one member chosen from a group comprising laptop computer, tablet, and smartphone.

13. The electronic device stand of claim 12, wherein in an open configuration of said electronic device stand, said electronic device rests on said extending first resting portion and said extending second resting portion, and wherein said first stopping portion and said second stopping portion stabilize said electronic device by contacting and immobilizing said electronic device on said electronic device stand.

14. The electronic device stand of claim 13, wherein in said open configuration of said electronic device stand, said extending first resting portion and said extending second resting portion are positioned above one or more supporting surfaces such that a space is defined between one or more of said supporting surfaces and each of said extending first resting portion and said extending second resting portion.

15. The electronic device stand of claim 1, further comprising a first raising portion extending downward and away from said extending first resting portion and a second raising portion extending downward and away from said extending second resting portion, such than in an open configuration of said electronic device stand, said first raising portion and said second raising portion are supported on one or more surfaces that lie along a same plane and raise said first arm and said second arm above said one or more surfaces such that a space is defined between one or more of said surface and said extending first resting portion and said extending second resting portion.

16. The electronic device stand of claim 15, wherein said space facilitates air circulation underneath said electronic device resting on said extending first resting portion and said extending second resting portion.

17. The electronic device stand of claim 1, wherein a width at one end of said first arm or said one end of said second arm is approximately one half of a width of said another end of said first arm or said another end of said second arm, respectively.

18. The electronic device stand of claim 1, wherein said base, said first arm, and said second are made from aluminum.

19. A method of assembling an electronic device stand, said method comprising:
   obtaining a base, a first arm, a second arm, a first fastening assembly, and a second fastening assembly;
   engaging, using said first fastening assembly, said first arm to one end of said base, wherein said base includes:
      a horizontal support;
      a first vertical support, which is approximately 90 degrees with respect to said horizontal support and comprises a first arm-receiving portion having first grooves defined therein;
      a second vertical support, which is substantially parallel to said first vertical support and approximately 90 degrees with respect to said horizontal support and comprises a second arm-receiving portion having second grooves defined therein; and
      wherein said first arm includes a first threaded engaging end; and wherein during said engaging said first arm to one of said end of said base, said first threaded engaging end engages with said first grooves of said first arm-receiving portion;
   coupling, using said second fastening assembly, said second arm to another end of said base; wherein said second arm includes a second threaded engaging end, and wherein during said coupling said second arm to another of said end of said base, said second threaded engaging end engages with said second grooves of said second arm-receiving portion; and
   wherein each of said first fastening assembly and said second fastening assembly includes a rotation-restraining object having defined therein two channels, each of which are approximately 90 degrees to each other, and said method further comprises slidably receiving at one of said channels a pin, depending on the rotational direction of said first arm or said second arm, to limit a rotational displacement of said first arm or said second arm around said first fastening assembly or said second fastening assembly.

20. A method of using an electronic device stand, said method comprising:
   obtaining said electronic device stand comprising:
      a base comprising:
         a horizontal support;
         a first vertical support including a first arm-receiving portion having first grooves defined therein;
         a second vertical support including a second arm-receiving portion having second grooves defined therein; and
         wherein said first vertical support and said second vertical support being disposed on two ends of said horizontal support;
      a first arm comprising:

an extending first resting portion for resting an electronic device;

a first stopping portion that extends from said first resting portion and is designed for immobilizing said electronic device resting on said first resting portion;

a first receiving portion;

a first threaded engaging end, which is disposed below said first receiving portion;

a first fastening assembly for coupling said first threaded engaging end to said first grooves of said first vertical support;

a second arm comprising:

an extending second resting portion for resting said electronic device;

a second stopping portion that extends from said second resting portion and is designed for immobilizing said electronic device resting on said second resting portion;

a second receiving portion;

a second threaded engaging end, which is disposed below said second receiving portion;

a second fastening assembly for coupling said second threaded engaging end to said second grooves of said second vertical support; and collapsing said electronic device stand such that said first receiving portion receives said second stopping portion, such that said second receiving portion receives said first stopping portion, and said first arm extends anti-parallel to and abuts said second arm.

21. The method of using said electronic device stand of claim 19, further comprising opening said electronic device stand such that said first arm extends parallel to said second arm, and each of said first arm and said second arm extend approximately 90 degrees with respect to said base.

* * * * *